F. R. CARTER, O. A. OTTEN, AND J. C. WILLARD.
ICE CREAM BRICK CENTER PUNCH.
APPLICATION FILED JAN. 31, 1922.

1,429,405.  Patented Sept. 19, 1922.

Fig.3.b.

JOHN C. WILLARD.
OSCAR A. OTTEN.   INVENTORS.
FLOYD R. CARTER.
BY
Emil F. Lange ATTORNEY.

Patented Sept. 19, 1922.

1,429,405

UNITED STATES PATENT OFFICE.

FLOYD R. CARTER, OSCAR A. OTTEN, AND JOHN C. WILLARD, OF FAIRBURY, NEBRASKA.

ICE-CREAM-BRICK CENTER PUNCH.

Application filed January 31, 1922. Serial No. 533,128.

*To all whom it may concern:*

Be it known that we, FLOYD R. CARTER, OSCAR A. OTTEN, and JOHN C. WILLARD, citizens of the United States, residing at Fairbury, in the county of Jefferson and State of Nebraska, have invented certain new and useful Improvements in Ice-Cream-Brick Center Punches, of which the following is a specification.

In the manufacture of brick ice cream, many attempts have been made to attract the eye or to tickle the palate by combining ice cream of different colors or flavors. Some of the methods thus evolved have come into extensive use but all of them have serious defects which prevent their more general adoption. The machines for making layer bricks are sometimes very efficient, but their cost is such that only the larger ice cream manufacturers can afford to install them. We are also aware that tools have been designed for working designs into the ice cream, but the use of these tools as a rule involves a prohibitive amount of time and labor. Moreover, none of the machines or methods, so far as we are aware, can be employed to produce intricate designs in ice cream bricks.

Our invention relates to the manufacture of ice cream bricks having designs or figures extending therethrough from end to end so that when the bricks are sliced, each slice will have the same design or figure, and the objects of our invention are—

First, the provision of a set of tools which can be made and sold at a price which is within the reach of every manufacturer of ice cream, which can be used to produce designs from the simplest to the most intricate, and which will produce clean cut and sharply outlined designs, and Second, the development of a process for most effectively using the tools to secure the most satisfactory results with the expenditure of the least amount of time and labor.

Having in view these and other objects which will appear as the description developes, we now refer to the drawings, in which—

Figure 1:
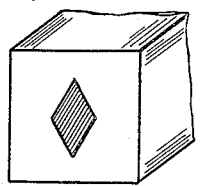
Figure 1 shows a portion of a brick of ice cream having a diamond design extending through the center thereof, and Figure 1ª shows in end view and elevation the die for cutting the diamond.

Our method is very simple and can be described in a few words. We first provide ourselves with a die or punch in the form of a hollow cylinder the length of which is slightly greater than that of the standard ice cream brick. The cutting edge and the cross section of the die or punch have the outline of the desired design. In use we simply force the punch through the brick of ice cream and then withdraw it with the core. We then fill the cavitiy in the brick with other ice cream, fruit pulp, confectionery, pastery or other desirable filler and finally subject the brick to further low temperatures. This in brief explains the process for producing the design shown in Figure 1.

Figure 2:
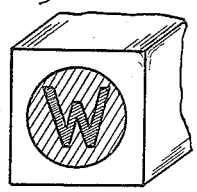
Figure 2 illustrates a portion of a brick with a circular ornamentation having a design within the circle, and Figures 2ª and 2ᵇ show in end view and elevation the dies for cutting the design shown in Figure 2.
Figure 3:
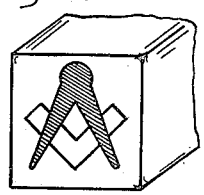
Figure 3 illustrates a square and compass design extending through the center of an ice cream brick, and Figures 3ª and 3ᵇ show in end view and elevation the dies for cutting the square and compass.
Figure 1A:
Figure 2A:
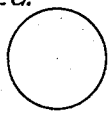
Figure 2B:
Figure 3A:
Figure 3A:
Figure 3A:
Figure 3A:
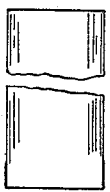
Figure 3A:
Figure 3A:
Figure 3A:
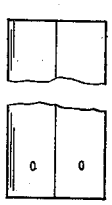

To obtain a smaller design within a larger one, we first cut the larger design with an appropriate punch, fill the cavity, cut the smaller design and fill its cavity, as clearly shown in Figure 2. The production of overlapping designs, as in the Masonic emblem is however somewhat more difficult especially when it is desired to have the overlapping parts appear in different colors or materials, and we believe that we are the first to discover a method for accomplishing this desult. As reference to Figure 3 will show, we first cut the design of the square and fill the cavity, after which we cut the compass design and fill that cavity. In this way we are able to produce almost any desired monogram effect in the brick of ice cream.

Figure 4:
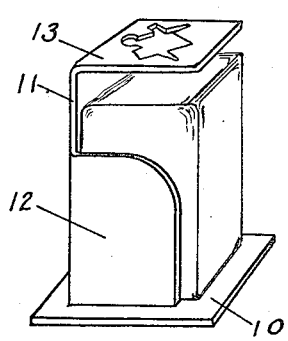
Figure 4 shows a guide for entering the punches.

A very small amount of practice will enable any one to properly center the punch on an ice cream brick and to cut it in such a way that the cavity throughout its entire length will be centered. While we prefer to do this free hand, we have added to the equipment a centering support, as shown in Figure 4. This consists of a base 10, an upright 11 having a right-angled portion 12, and a top 13. The top 13 may be integral or detachable, and serves as a guide for the punch, being provided with an aperture for the passage of the punch. If preferred, the top 13 alone may be employed by placing it on the surface of the brick. The greatest usefulness of the guide is in connection with the compound designs.

With our invention, it is possible to produce designs which are suitable to practically every kind of social gathering at very little added cost. When refreshments are served at a card party, the ice cream manufacturer can on short notice furnish bricks with an appropriate design, as for example hearts, clubs, spades, and diamonds in their proper colors. The ice cream is served in slices from the brick, and each slice has the same design. At a valentine party a heart design is appropriate. At halloween a pumpkin outline makes a good design, and if the jack-o-lantern features are desired, they may be produced by the method indicated in Figure 2. At a lodge or society gathering, the emblem of the lodge or society may be placed in the ice cream, and when a suitable color combination is selected, the result is very attractive. The same thing is true at a private party, where the monogram of the hostess may serve as the design. In fact the variations in this idea are practically unlimited.

Figure 5:
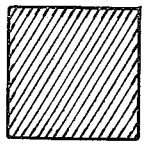
Figure 5 shows a section of an ice cream brick in its ripened condition for cutting the design.

In our earlier efforts we found that if the brick is very cold and hard, the punch will freeze tight before it can be forced through the brick. We then tried slow warming to bring the ice cream to a proper consistency for punching, but we found that by the time the temperature had been brought to a point where the punch would not stick, the brick would tend to collapse when the pressure of the punch was applied. Moreover the cut would be ragged, thus making it impossible to produce designs with clean outlines, and we believe that the commercial failure of other similar inventions was due to the fact that this problem was not solved. We have overcome the difficulty by first freezing the brick hard, then slowly warming it uniformly to a semiplastic state, and finally subjecting it for a few minutes to intense cold in a refrigerator. This last step has the effect of freezing the surface of the brick, or in other words, of case hardening the brick. This hard outer shell prevents collapse of the brick and prevents "flowing" in the semiplastic mass on the inside, thereby making possible a "clean" cut. Figure 5 of the drawings shows a case hardened brick in section. The punch is warmed in hot water or otherwise, before using.

Having thus described our method of ornamenting bricks of ice cream and the dies for carrying out our process, what we claim as new and desire to protect by Letters Patent of the United States is:—

1. A device for cutting compound ornamental cavities in a brick of ice cream from end to end of the brick, comprising a plurality of punches each having a cutting edge in the form of an element of the compound design, the cross section of each of the punches corresponding in size and form to the cutting edge thereof.

2. The method of producing ornamental designs in ice cream bricks which consists in freezing the bricks until they become rigid, then slowly warming them to maintain a uniform temperature throughout until they are semiplastic in consistency, then subjecting them for a brief period of time to a much lower temperature to harden the walls of the bricks, then punching cavities in the bricks, and finally filling the cavities with edible material and refreezing the bricks.

3. The method of producing compound designs in a brick of ice cream which consists in first freezing the brick, then warming the brick until it becomes semiplastic in consistency, then case hardening the brick by subjecting it briefly to a low temperature, then punching an element of the compound design in the brick, then filling the cavity with edible material, then again case hardening the brick, then punching another element of the design in the brick and filling the cavity thus produced with an edible material which differs from the edible material in the first said cavity, repeating thus until the compound design is complete, and finally refreezing the brick.

In testimony whereof we affix our signatures.

FLOYD R. CARTER.
OSCAR A. OTTEN.
JOHN C. WILLARD.